US009611971B2

(12) United States Patent
Aguilar et al.

(10) Patent No.: US 9,611,971 B2
(45) Date of Patent: Apr. 4, 2017

(54) DEVICE FOR PROTECTING A MALE END OF A COMPONENT OF A FLEXIBLE-JOINT THREADED TUBULAR CONNECTION

(71) Applicant: VALLOUREC OIL AND GAS FRANCE, Aulnoye-Aymeries (FR)

(72) Inventors: Jose Antonio Aguilar, Veracruz (MX); Alfonso Hernandez, Veracruz (MX)

(73) Assignee: VALLOUREC OIL AND GAS FRANCE, Aulnoye-Aymeries (FR)

( * ) Notice: Subject to any disclaimer, the term of this patent is extended or adjusted under 35 U.S.C. 154(b) by 57 days.

(21) Appl. No.: 14/442,846

(22) PCT Filed: Nov. 18, 2013

(86) PCT No.: PCT/EP2013/074088
§ 371 (c)(1),
(2) Date: May 14, 2015

(87) PCT Pub. No.: WO2014/079811
PCT Pub. Date: May 30, 2014

(65) Prior Publication Data
US 2015/0308605 A1  Oct. 29, 2015

(30) Foreign Application Priority Data
Nov. 26, 2012  (FR) ..................... 12 61256

(51) Int. Cl.
*F16L 57/00* (2006.01)
*E21B 17/00* (2006.01)
(Continued)

(52) U.S. Cl.
CPC .......... *F16L 57/005* (2013.01); *E21B 17/006* (2013.01); *E21B 17/042* (2013.01); *B65D 59/06* (2013.01)

(58) Field of Classification Search
CPC .... F16L 57/005; E21B 17/006; E21B 17/042; B65D 59/06; Y10S 285/901
(Continued)

(56) References Cited

U.S. PATENT DOCUMENTS 4,020,873 A   5/1977  Palarino
4,185,665 A * 1/1980  Flimon .................. F16L 57/005
                                                    138/89
(Continued)

FOREIGN PATENT DOCUMENTS

CN      1922433 A    2/2007
CN    102597599 A    7/2012
(Continued)

OTHER PUBLICATIONS

International Search Report Issued Dec. 6, 2013 in PCT/EP2013/074088 Filed Nov. 18, 2013.

*Primary Examiner* — Patrick F Brinson
(74) *Attorney, Agent, or Firm* — Oblon, McClelland, Maier & Neustadt, L.L.P.

(57) ABSTRACT

A temporary protector of a male end of a component of a threaded tubular connection, including externally at least one threading and a free end part. The protector includes a coupling to protect at least part of the external threading and the free end part and including a threading that can engage with the threading of the male end, and a sealing device configured to be placed in contact with the component, at least in a part located downstream of the external threading of the male end, and to provide a seal downstream of the external threading. The sealing device includes a portion of small diameter including an internal sealing surface that can interact hermetically with an external surface of the body, and a portion of large diameter including an internal sealing
(Continued)

surface interacting hermetically with an external surface of the coupling, the sealing device being radially elastic.

19 Claims, 7 Drawing Sheets

(51) Int. Cl.
   *E21B 17/042* (2006.01)
   *B65D 59/06* (2006.01)
(58) Field of Classification Search
   USPC ............. 138/89, 96 T, 96 R; 285/355, 901
   See application file for complete search history.

(56) References Cited

U.S. PATENT DOCUMENTS

| | | | | |
|---|---|---|---|---|
| 4,733,888 | A * | 3/1988 | Toelke | B65D 59/06 138/89 |
| 4,796,668 | A * | 1/1989 | Depret | B65D 59/00 138/96 R |
| 6,027,145 | A | 2/2000 | Tsuru et al. | |
| 6,869,111 | B2 | 3/2005 | Goto et al. | |
| 6,933,264 | B2 | 8/2005 | Petelot | |
| 7,284,770 | B2 * | 10/2007 | Dell'erba et al. | B65D 59/06 138/96 T |
| 8,181,707 | B2 * | 5/2012 | Evans | E21B 17/042 166/207 |
| 2005/0045240 | A1 * | 3/2005 | Casteran | F16L 15/004 138/96 T |
| 2005/0166986 | A1 * | 8/2005 | Dell'erba et al. | B65D 59/06 138/96 T |
| 2006/0042709 | A1 | 3/2006 | Takano | |
| 2010/0089484 | A1 * | 4/2010 | Courtois | F16L 57/005 138/96 T |
| 2010/0108174 | A1 | 5/2010 | Qiao | |
| 2013/0299037 | A1 * | 11/2013 | Drouin | B65D 59/06 138/96 T |

FOREIGN PATENT DOCUMENTS

| | | |
|---|---|---|
| EP | 0 148 807 | 7/1985 |
| EP | 1 211 451 | 6/2002 |
| FR | 2 892 174 | 4/2007 |
| JP | 2003 240188 | 8/2003 |
| WO | 03 102457 | 12/2003 |
| WO | 2005 024282 | 3/2005 |
| WO | 2005 075877 | 8/2005 |
| WO | 2008 087302 | 7/2008 |
| WO | 2012 028692 | 3/2012 |

* cited by examiner

DEVICE FOR PROTECTING A MALE END OF A COMPONENT OF A FLEXIBLE-JOINT THREADED TUBULAR CONNECTION

BACKGROUND

The invention relates to the components of threaded tubular connections, used for example in petroleum applications, and more precisely the protection of the male end of certain of these components.

Here, by "component" is meant any element or accessory used for drilling or operating a well and intended to be assembled by threading to another component so as to constitute, with this other component, a threaded tubular connection. The component can be for example a tube of relatively great length (in particular of about ten meters in length), a tubular coupling of some tens of centimeters in length, an accessory of these tubes (suspending device or "hanger", part for change of cross-section or "cross-over", safety valve, drillpipe connector or "tool joint", "sub", and the like).

The components are generally assembled together to be lowered into the oil wells or similar wells and constitute a drill string, a string of casing pipes or liners, or a string of production pipes ("tubing") (production strings).

Specification API 5CT issued by the American Petroleum Institute (API), equivalent to standard ISO 11960: 2004 issued by the International Organization for Standardization (ISO), covers the pipes used as casing or tubing, and specification API 5B defines standard threads for these pipes.

Specification 7 of the API defines threaded connectors with shoulder for rotating drillpipes.

The manufacturers of components of threaded tubular connections have also developed so-called "premium" threaded connections, which have specific thread geometries, and specific means giving them better performance in service, in particular with respect to mechanical strength and hermeticity.

The aforementioned components have a threaded male end that is intended to be made up into a threaded female end of another drilling or production component. It is therefore essential that their male end suffers the least possible damage, contamination and deterioration between the moment when they leave their manufacturing line and when they are used, as well as between two successive uses. It will be understood that it is in fact necessary to protect, against corrosion, dust and shocks (or impacts), not only the threading, but also any shoulder(s) and stop(s), each of which have specific, complementary functions, in particular for ensuring hermeticity when in use.

The ends of the aforementioned components have generally been coated just before assembly with a grease with anti-galling properties.

It has been proposed, in particular in U.S. Pat. No. 6,933,264, U.S. Pat. No. 6,869,111 and WO 2003/102457, to replace the grease, finally applied by brush on the end of the component, with a thin layer, of predetermined thickness applied in the factory, of a "semi-dry" lubricant free from heavy metals.

It has also been proposed, in particular in U.S. Pat. No. 6,027,145, EP 1211451 and FR 2892174, to replace the grease finally applied by brush on the end of the component, with a thin layer, of predetermined thickness applied in the factory, of a dry lubricant based on particles of solid lubricants.

In these cases with application of a dry or semi-dry lubricant in the factory, it is therefore also and more particularly necessary to provide the best possible protection of the layer of lubricant, with which the ends of the components are coated, both against mechanical removal and against contamination (sand, debris), which are detrimental to the effectiveness of the lubricant.

To provide one or more of these types of protection, generally, as is stipulated in specification API 5CT (in paragraph 12.2), a protective device is fitted on the male and female ends of the components of threaded tubular connections. A great many devices of this type have been proposed, in particular in EP 0148807, US 2006/0042709, WO 2005/075877 and WO 2005/024282, the three last documents relating more particularly to protectors for joints precoated with lubricant in the factory. It has been demonstrated that some of them present risks of damaging the protective device during fitting.

WO2012/028692 envisages an elastomer film between the protector and the component, fixed to the protector by bonding or with a fixing collar, the collar being welded to the protector. The film is provided with a slip agent between the film and the component. The film is in interference with the zone of the imperfect threads of the component. The film is torn during withdrawal of the protector and therefore can only be used once. Hermeticity is low. The assembly is difficult to install on the component. There is a high risk of damaging the film.

Based on their respective embodiments, these known protective devices provide hermeticity downstream of the threading (therefore in a zone the diameter of which is often that of the body or running part of the component) which varies in relation to the dimensional variations of the components. Thus, the outside diameter of a tube body according to specification API 5CT can vary by + or −0.79 mm for tube bodies with diameter less than 114.3 mm and from −0.5% to +1% of the diameter for tubes with diameter greater than or equal to 114.3 mm (i.e. from −0.89 mm to +1.78 mm for a tube body with a diameter of 177.8 mm).

BRIEF SUMMARY

The applicant realized that these male end protective devices do not offer adaptability of the hermeticity to the dimensional differences of the components (unless the components are machined externally, which is inconvenient) and can be very tight and therefore difficult to fit. Assembling them can in particular result in damaging parts of the protective device and/or scraping and removing some or all of the layer of lubricant coating the male ends, in particular when it is installed permanently. It is in fact necessary to take into account that a protector must be able to be easily mounted and dismounted several times, without removing the lubricant, so as to allow inspection of the male ends during storage of the components or to protect the male ends of components withdrawn from the well.

WO2008/087302 proposes protection by half-shells with clamping. Good-quality hermeticity is obtained, but it requires a large number of components.

The invention has the aim of improving the situation, in particular in terms of simplicity of use and robustness, while obtaining a good-quality seal and the possibility of inspection.

The invention proposes a temporary protector for the male end of a component of a threaded tubular connection for drilling or operation of oil wells, provided externally with at least one threading and comprising a free end part. The component comprises a body downstream of the male end. Said protector comprises a coupling arranged for protecting at least a part of said external threading and said free end part and provided with a threading that is able to engage with the threading of the male end, and a sealing device suitable for being placed in contact, on the one hand, with said component, at least in a part located downstream of said external threading of the male end, and on the other hand, with said coupling so as to provide a seal downstream of said external threading. The sealing device comprises a portion of small diameter with a length comprised between 20 and 80 mm and with a bore as a cylinder of revolution. The portion of small diameter is provided with an internal sealing surface that can interact hermetically with an external surface of the body having a maximum tolerance on diameter above 1% and a roughness Ra greater than 10 μm. The sealing device comprises a portion of large diameter integral with the portion of small diameter and provided with an internal sealing surface interacting hermetically with an external surface of the coupling. Said sealing device is radially elastic.

In an embodiment, the sealing device comprises a portion of small diameter with a length comprised between 25 and 70 mm. The length of the portion of small diameter is independent of the diameter of the protector.

In an embodiment, the sealing device has a length comprised between 75 and 190 mm, preferably between 90 and 140 mm. The length of the sealing device is independent of the diameter of the protector.

In an embodiment, the coupling is made from high-density polyethylene, ultra-high-density polyethylene, polycarbonate, or PC/PBT.

In an embodiment, the portion of small diameter has a thickness comprised between 2 and 8 mm, preferably between 2 and 5.5 mm, and the portion of large diameter has a thickness comprised between 2 and 8 mm, preferably between 2 and 5.5 mm. This thickness provides resistance to external aggressive factors and adaptation to the irregularities of the contact surface.

In an embodiment, the internal sealing surface of the portion of small diameter and the internal sealing surface of the portion of large diameter are made of the same material and/or the portion of small diameter and the portion of large diameter are made of the same material. Manufacture is simplified by the fact that the seal is provided by the internal surfaces of said portions of small diameter and of large diameter.

In an embodiment, the internal sealing surface of the portion of large diameter is in direct contact with the coupling. A step of application of an additional agent, sometimes contaminating, is avoided.

In an embodiment, said internal sealing surface of the portion of large diameter is cylindrical. The portion of large diameter is easy to manufacture.

In an embodiment, said internal sealing surface of the portion of large diameter has at least one annular rib directed inwards. The portion of large diameter provides holding on the coupling.

In an embodiment, the sealing device comprises a linking portion between the portion of small diameter and the portion of large diameter. Said linking portion can be of thickness equal to the thickness of said portion of small diameter and said portion of large diameter. Manufacture of the device is economical.

In an embodiment, the external surface of said coupling is arranged at a distance axially from said threading made on the bore of said coupling. Said threading can comprise from 4 to 10 threads, preferably from 5 to 8 threads. Make up of the protector is quick and easy.

In an embodiment, said external surface of the coupling is a cylinder of revolution. The coupling and the sealing device can interact by tightening. This proves advantageous, in particular for large coupling diameters.

In another embodiment, said external surface of the coupling and said internal sealing surface of the portion of large diameter interact by complementarity of convex and concave forms. A portion of the external surface of the coupling can be tapered. This proves advantageous, in particular for small coupling diameters.

In an embodiment, the sealing device comprises at least one annular extra thickness on the portion of small diameter and projecting outwards. The annular extra thickness increases the clamping on the body of the component.

In an embodiment, the sealing device comprises an envelope at least partly surrounding the coupling and at least partly the portion of large diameter, said envelope comprising a folded edge on one end of the coupling and an end opposite to said edge and clamping said portion of large diameter against the coupling. The envelope can be made of steel sheet, preferably galvanized. The envelope protects the coupling in an aggressive environment. The sheet can be based on rolled steel.

In an embodiment, the portion of large diameter comprises an external surface flush with an external surface of the coupling. This facilitates fitting of the sealing device and reduces the risk of operator injury.

In an embodiment, the protector comprises a sealing element that can bear on a surface of the male end. Intrusion of foreign bodies (sand, salt, water etc.) from the end part of the male end is avoided.

In an embodiment, said sealing element comprises an annular lip integral with the coupling.

In an embodiment, said sealing element comprises an annular lip provided with a rounded surface over at least 90°.

In an embodiment, said sealing element comprises an annular lip oriented axially and radially to the sealing device.

In an embodiment, said sealing element comprises an annular lip supported by a wall of the coupling arranged axially opposite the sealing device.

In an embodiment, said sealing element comprises an annular lip that can bear on an internal surface of the male end. Said internal surface can comprise a chamfer machined between an axial end surface and the bore of the body. Said internal surface can be tapered. Said internal surface can be inactive in a position with the male end made up with a corresponding female end. Said axial end surface can be inactive in a position with the male end made up with a corresponding female end. Said surface is provided on the male end for making the junction between the as-rolled bore and the machined axial end surface, while lacking a true sealing function in the connected state. Thus, any slight deterioration of said surface during handling of the protector is independent of the properties of hermeticity in the connected state.

In an embodiment, the protector comprises a radial partition closing off the coupling on the side opposite the sealing device.

The invention also relates to a component of a threaded tubular connection for drilling or operation of oil wells, comprising a male end provided externally with at least one threading and comprising a free end part. Said component is equipped with a temporary protector made up onto said threading. The temporary protector protects the male end.

The component comprises a body downstream of the male end. Said protector comprises a coupling arranged for protecting at least a part of said external threading and said free end part and provided with a threading that is able to engage with the threading of the male end, and a sealing device suitable for being placed in contact, on the one hand, with said component, at least in a part located downstream of said external threading of the male end, and on the other hand, with said coupling so as to provide a seal downstream of said external threading. The sealing device comprises a portion of small diameter with a length comprised between 20 and 80 mm and with a bore as a cylinder of revolution. The portion of small diameter is provided with an internal sealing surface that can interact hermetically with an external surface of the body having a maximum tolerance on diameter above 1% and a roughness Ra greater than 10 μm. The sealing device comprises a portion of large diameter integral with the portion of small diameter and provided with an internal sealing surface interacting hermetically with an external surface of the coupling. Said sealing device is radially elastic.

Said portion of small diameter is in sealing contact with said component, at least in a part located downstream of said external threading of the male end.

In an embodiment, the diameter in the free state of the portion of small diameter of the sealing device is less than the diameter of the external surface of the body 1 on which the portion of small diameter is mounted. The difference in diameter can be of the order of 2 to 20%, preferably 2 to 10% and more preferably about 5%.

The invention also proposes a method of mounting a protector on a male end of a component of a threaded tubular connection for drilling and operation of oil wells, the male end provided externally with at least one threading and comprising a free end part, the component comprising a body downstream of the male end. It uses a protector comprising a coupling provided with a threading that is able to engage with the threading of the male end, and a sealing device placed in contact with said coupling and comprising a portion of large diameter integral with a portion of small diameter and provided with an internal sealing surface interacting hermetically with an external surface of the coupling, said sealing device being radially elastic. The portion of small diameter is removed from the sealing device and the protector is made up onto the threading of the male end, thus protecting at least a part of said external threading and said free end part. The sealing device is brought in contact with said component, at least in a part located downstream of said external threading of the male end, with a portion of small diameter with a length comprised between 20 and 80 mm and with a bore as a cylinder of revolution, the portion of small diameter being provided with an internal sealing surface interacting hermetically with an external surface of the body having a maximum tolerance on diameter above 1% and a roughness Ra greater than 6.

In an embodiment, the portion of small diameter is removed from the sealing device by folding onto the portion of large diameter. After make up of the coupling, the portion of small diameter is pushed back on the external surface of the body.

In an embodiment, for transporting the protector before mounting on a male end, the portion of small diameter of the sealing device is folded inwards into the bore of the coupling.

By "male end" is meant the portion of a component provided with machined and/or ground surfaces with a view to forming a seal with a corresponding female portion and by "body" is meant the portion of a component located beyond that and provided with as-rolled surfaces. The as-rolled surfaces have a roughness and a tolerance on diameter far greater than the roughness and tolerance on diameter of the machined surfaces. The bore of the body can extend to an axial position different from the axial position to which the external surface of the body extends. In other words, for a male end, the length of the machined external surface is greater than the length of the machined internal surface.

BRIEF DESCRIPTION OF THE DRAWINGS

Other features and advantages of the invention will become apparent on examining the detailed description given below, and the attached drawings, in which.

The appended drawings can not only serve to supplement the invention, but can also contribute to definition thereof, if applicable.

DETAILED DESCRIPTION

The invention has the aim of permitting protection of the threaded male end of a tubular component of a threaded tubular connection (intended for the drilling or operation of oil wells or similar) against mechanical damage, contamination (chemical and material) and deterioration (corrosion) between the time when it leaves the manufacturing line and when it is used (with possibility of several mountings and dismountings of the protective device), but also between two successive uses, by limiting (or even preventing) scraping and/or removal of the (anti-corrosion) storage and/or make up lubricant, more particularly when said lubricant is applied permanently (lubricant of the semi-dry or dry type described above), despite the dimensional variations of the tubular component (in particular of its outside diameter). It also has the aim of allowing quick and reliable mounting and dismounting on site of the protector on a male end and of allowing easy inspection of the condition of the threadings before use or between two successive uses of the component. It avoids using additional products for installation.

It is considered in the following that the component is intended for the drilling or operation of oil wells and that it is equipped with a male end of a coupled threaded tubular connection of the VAM® class or equivalent. However, the invention is not limited to this type of component, or to the type of male end mentioned above. The invention in fact relates to any type of component of a threaded tubular connection for drilling or operation and any type of threaded male end of a component and in particular those of the API type and those of the "premium" type, such as the VAM threaded tubular connections.

It should be pointed out that a tubular component comprises a body 1 or running part terminated by two ends: two male ends, a male end and a female end, or two female ends. The component is made of steel or of stainless steel. The invention relates to a component having at least one male end 2.

The external threading 3 of the male end 2 can be as one or more separate threaded parts, arranged on cylindrical or conical surfaces.

When the or a threaded part is conical, the latter can be subdivided into a sub-part said to have perfect threads, the profile of which is constant and free from irregularity or imperfection (for example of the burr type) and a sub-part said to have vanishing or imperfect threads, of gradually decreasing height and with a profile that can have irregularities or imperfections.

The threading 3 of the male end 2 of the component can comprise at least two separate threaded parts spaced axially and/or radially apart, and each of these parts can comprise perfect threads and vanishing threads.

The free end part 4 of the male end 2 of the component generally ends in an annular surface with approximately transverse orientation.

The male end 2 can also comprise one or more axial stop surfaces 5 for a female end of another component intended to be assembled with the component in question (at the free end, downstream of the threading or between two threaded parts) and one or more metal-to-metal sealing surfaces 6 (at the free end, downstream of the threading or between two threaded parts) with the female end in question. The protector is preferably designed for also protecting these stop surfaces and/or these sealing surfaces against mechanical damage or corrosion.

The embodiments presented below, by way of non-limitating examples, relate to a male end of a VAM TOP® coupled threaded tubular connection for the embodiment in FIGS. 1 to 4 and VAM 21® for the embodiment in FIGS. 11 to 14.

It should be pointed out that a male end of a VAM TOP threaded tubular connection comprises:
  a conical threading with a sub-part with perfect threads on the side of the free end part and a sub-part with vanishing threads on the side of the body (or running part) of the component;
  a stop surface constituted by the transverse annular surface of the free end part of the male end; and
  a metal-to-metal sealing surface adjacent to the stop surface on the external peripheral surface of the free end part.

The body 1 comprises an as-rolled bore 8. The bore 8 and the machined axial stop 5 are connected by a machined internal surface 7.

A protector 10 generally comprises a coupling 20 and a sealing device 40 that interact and are to be placed on the (threaded) male end 2 of a component.

The coupling 20 has the function of protecting at least a part of the external threading 3 of the male end 2 and the free end part 4 also forming part of the male end 2. The coupling 20 is preferably integral. The coupling 20 comprises an end part 21 intended to be placed at the level of the free end part 4, and preferably having a radial projection inwards in the form of a thick collar for absorbing shocks and impacts, and intended to cover the transverse annular surface at the end of the free end part 4 of the male end 2 (stop surface) in order to provide a (second) continuous local seal on its entire circumference at this level.

Here, by "external" is meant an element arranged on a surface (or a surface) which is oriented in a direction radially opposite the axis XX of the male end 2. Conversely, here by "internal" is meant an element (or a surface) which is oriented towards the axis XX of the male end 2.

As protection is in particular mechanical, the coupling 20 must display a certain rigidity, while being capable of at least partially absorbing impacts. For this purpose, coupling 20 can for example be made by injection of a thermoplastic into a suitable mould. Among the various classes of thermoplastics that can be used advantageously, there may be mentioned in particular polycarbonate-based blends such as polycarbonate-polyester (PC-PBT or PC-PET) and the polyethylenes (PE) of high or ultra-high density (HDPE, UHDPE).

Specification API 5CT, 2005 edition, stipulates, in Appendix I, requirements for protective devices for threads, in particular minimum values of axial and skew (at 45°) impact strength for three temperatures (−46, +21 and +66° C.).

It is possible, for example, more particularly to select an HDPE made by the company DOW and sold under the name DMBA-8904-NT7 or made by the company BASELL and sold under the name LUPOLEN 4261 AG UV 6005, a UHDPE made by the company TICONA and sold under the name GUR 5113, or a PC-PBT made by the company BAYER and sold under the name MAKROBLEND S7916.

It should be noted that the coupling can optionally be (at least) partially cellular, in particular in its thick portions, for better absorption of impacts.

The sealing device 40 is intended to be placed in contact, on the one hand, with the component, at least in a part that is located downstream of the external threading 3 of the male end 2, and on the other hand, with the coupling 20. The sealing device 40 is more precisely intended to provide a first seal downstream of the external threading 3. The word "downstream" must be considered here relative to the free end part 4 of the male end 2, regarded as upstream.

The sealing device 40 is made from a material that is flexible, i.e. deformable, and elastic, i.e. can return more or less to its initial shape. Said material can offer an elongation at break greater than 300%. For this purpose, it can for example be made by injection from a flexible material that is resistant to corrosion, to chemical attack, in particular by industrial solvents and acids, and to prolonged exposure to UV radiation, without loss of mechanical properties. Among the various classes of materials that can be used advantageously, there may be mentioned in particular the neoprene elastomers such as Baypren 210 manufactured by LANXESS, EPDM such as Nordel IP Hydrocarbon Rubber manufactured by DOW, the nitriles, or one of these materials placed in a polyolefin matrix. Sealing device 40 can be constituted by said material.

Figure 1:
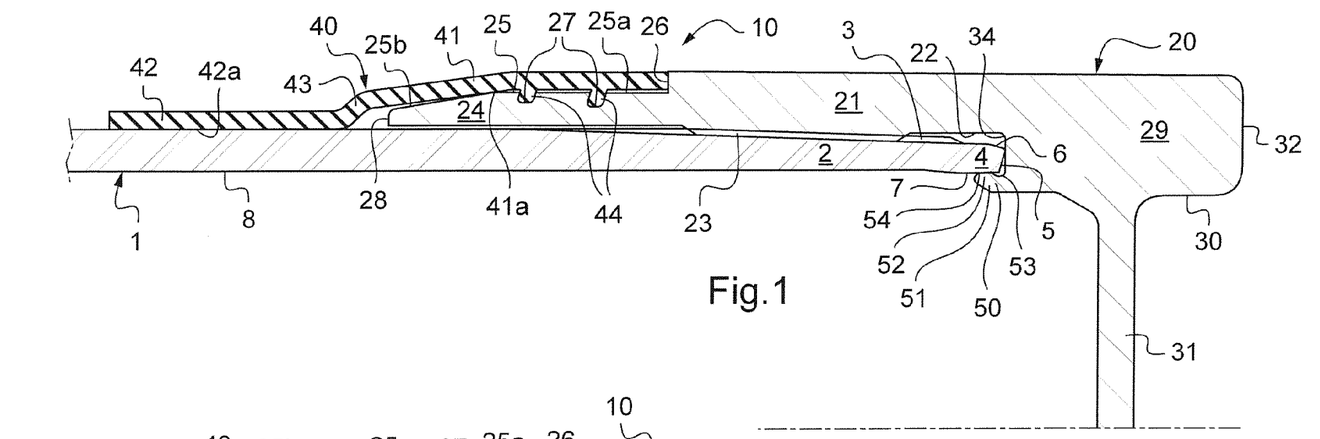
FIG. 1 shows diagrammatically, in a half-view in longitudinal section, a first example of a male end equipped with a protector.
Figure 2:
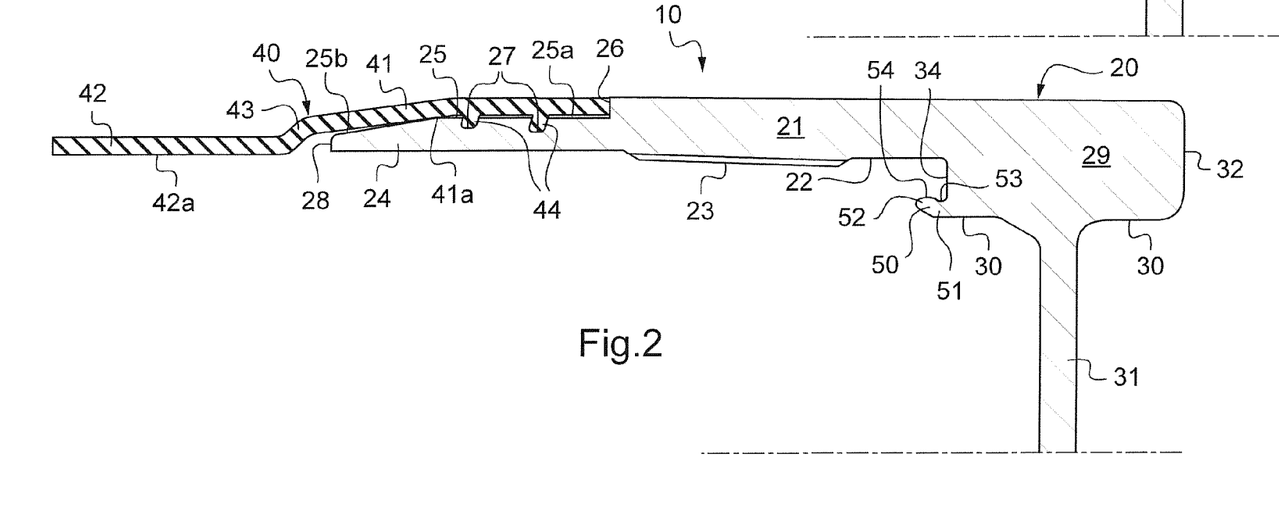
FIG. 2 shows diagrammatically, in a half-view in longitudinal section, a first example of a protector in the mounted state.
Figures 3, 4:
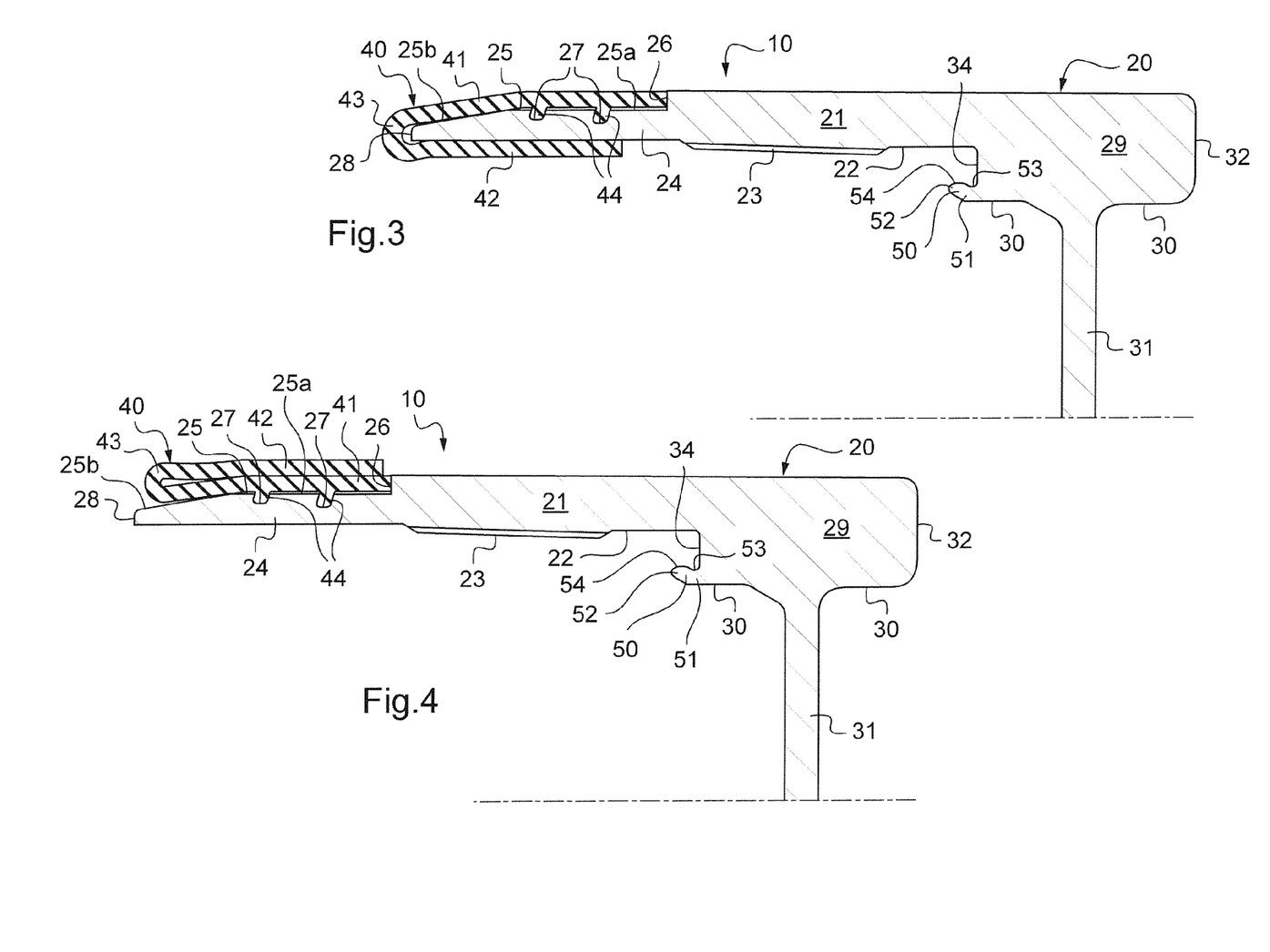
FIG. 3 shows diagrammatically, in a half-view in longitudinal section, a first example of a protector in the storage state.
FIG. 4 shows diagrammatically, in a half-view in longitudinal section, a first example of a protector in the state ready to be fitted.

As can be seen in FIGS. 1 to 3, coupling 20 comprises a central part 21 provided with a threading 23 on its bore 22. The central part 21 is provided with an external surface that is a cylinder of revolution. The threading 23 comprises from 4 to 10, preferably 5 to 8 threads. The number of threads is less than the number of threads of a male end 2 of a threaded tubular connection. Make up of the protector 10 is thus quicker than the make up of a female end of a threaded tubular connection. The threading 23 is adapted to the threading 3 of the male end 2, here tapered.

The coupling 20 comprises a downstream part 24 provided with a bore that is approximately a cylinder of revolution located in the extension, for example tangent, of bore 22 of the central part 21. The downstream part 24 is provided with an external surface 25 connecting to the external surface of the central part 21 by a radial shoulder 26. The external surface 25 of the downstream part 24 has a diameter less than the diameter of the external surface of the central part 21. The external surface 25 of the downstream part 24 is a surface of revolution. The external surface 25 of the downstream part 24 comprises a substantially cylindrical part 25a in the vicinity of the shoulder 26 and a tapered part 25b in the vicinity of an end surface 28 of the coupling 20. At least one annular groove 27, in this instance two, is made in the approximately cylindrical part 25a at a distance from the shoulder 26. The annular groove 27 has an inclined profile with edges inclined by about 65° to 90° (exclusive) relative to the axis of the coupling 20. Preferably, said angle is comprised between 70° and 80°, for example 75°.

The end surface 28 of coupling 20 joins the tapered part 25b of the external surface 25 of the downstream part 24 and the bore of the downstream part 24. The end surface 28 belongs to the downstream part 24. The end surface 28 can be rounded. In the embodiment shown, the end surface 28 has a radial portion and a wide fillet with tapered part 25b of the external surface 25. The threading 23 provided on the bore 22 of the central part 21 extends over a major part of said central part 21. Upstream, opposite the downstream part 24, the central part 21 can be provided with a bore that is approximately a cylinder of revolution.

The coupling 20 also comprises an upstream part 29 having an external surface located in the extension of the external surface of the central part 21, a bore 30 with smaller diameter than bore 22 of the central part 21, an annular surface forming a shoulder 34 between bore 22 of the central part 21 and bore 30 of the upstream part 29 and a radial end surface 32 arranged between the external surface and the bore 30 with wide fillets. The upstream part 29 of coupling 20 is intended to extend beyond the end part 4 of the male end 2 in order to protect it mechanically. The upstream part 29 provides the impact-protection function.

The coupling 20 also comprises a radial partition 31 forming a stopper and arranged in the bore 30 of the upstream part 29. Thus, bore 30 of the upstream part 29 is separated into two portions by said radial partition 31. In a variant that is not shown, the radial partition 31 is provided with openings, or even is absent. In the embodiments shown, the radial partition 31 seals the interior of the downstream part 24.

The coupling 20 is provided with a sealing element 50 that is able to come into contact with an internal surface of the male end 2, near the end surface of the male end 2. Here, the sealing element 50 is in the form of an annular lip. The sealing element 50 is integral with the coupling 20. The sealing element 50 comprises a base 51 extending axially downstream and an active part or lip 52 extending axially downstream and radially slightly outwards. The base 51 comprises an internal surface located in the extension of the bore 30 of the upstream part 29. The base 51 comprises a tapered surface extending from said internal surface axially downstream and radially outwards with a slope of the order of 20° to 40°. The active part 52 offers a rounded profile, if necessary with variable radii. The active part 52 has a convex profile 54 oriented outwards and connecting on one side with the tapered surface of the base 51 and on the other side with a concave fillet 53 connecting the annular surface or shoulder 34 of the upstream part 29 of the coupling 20. The fillet 53 can extend over an angular range comprised between 95° and 180°. The convex surface 54 of the active part 52 extends over an angular range comprised between 80° and 180°.

Thus, the sealing element 50 is oriented axially and radially towards the downstream part 24.

The sealing device 40 comprises a portion of large diameter 41 interacting with the coupling 20 and a portion of small diameter 42 interacting with an external surface of the component. The sealing device 40 is of integral design. The sealing device 40 is elastic at least in the radial direction. The material of the sealing device 40 is selected so as to offer an elongation at break greater than 300% at least in the radial direction. In the axial direction, the sealing device 40 can be configured so as to restrict its elongation.

The portion of small diameter 42 has a length comprised between 20 mm and 80 mm. The portion of small diameter 42 has a bore that is a cylinder of revolution. The portion of small diameter 42 is provided with an internal sealing surface 42a that can interact hermetically with the external surface of the body 1. The portion of small diameter 42 can adapt while ensuring hermeticity with the component despite a tolerance on the diameter of the external surface of the component greater than 1% as well as irregularities in terms of out-of-roundness or of eccentricity. The outside diameter of a tube body 1 according to specification API 5CTE can thus vary by plus or minus 0.79 mm for tube bodies 1 of diameter less than 114.3 mm and minus 0.5% to plus 1% of the diameter for tube bodies 1 of diameter greater than or equal to 114.3 mm. The internal sealing surface 42a of the portion of small diameter 42 is in direct contact with the external surface of the component. The portion of large diameter 41 interacts with the downstream part 24 of the coupling 20. The internal surface of the portion of large diameter 41 is in contact, on the one hand, with the substantially cylindrical part 25a and on the other hand with the tapered part 25b. The portion of large diameter 41 of the sealing device 40 is provided, on its bore, with at least one rib 44 corresponding to said annular groove 27 of the coupling 20. The number, the dimensions and the shape of the ribs 44 correspond to those of the grooves. Matching of shape and orientation of the grooves 27 and consequently of the ribs 44 ensures excellent axial retention of the sealing device 40 on the coupling 20. The sealing device 40 can come into contact with the shoulder 26 of the coupling 20. The external surface of the portion of large diameter 41 of the sealing device 40 has a diameter very slightly less than the external surface of the central part 21 of the coupling 20.

The portion of small diameter 42 has a thickness comprised between 2 mm and 8 mm, preferably between 2 mm and 5.5 mm, for example equal to 3 mm. The portion of large diameter 41 has a thickness comprised between 2 mm and 8 mm, preferably between 2 mm and 5.5 mm. The portion of small diameter 42 and the portion of large diameter 41 can have equal thicknesses, not taking the ribs into account.

The portion of large diameter 41 has an internal sealing surface 41a in direct contact with the substantially cylindrical part 25a and tapered part 25b of the external surface 25 of the downstream part 24 of the coupling 20. The application of sealing additives or of bonding is thus avoided. The internal sealing surface 42a of the portion of small diameter 42 and the internal sealing surface 41a of the portion of large diameter 41 can be made of the same material. The portion of small diameter 42 and the portion of large diameter 41 can be made of the same material.

The sealing device 40 comprises a linking portion 43 between the portion of small diameter 42 and the portion of large diameter 41. The linking portion 43 can be of thickness equal to the thickness of the portion of small diameter 42 and the portion of large diameter 41. The linking portion 43 adapts to the contours of the end surface 28 of the coupling 20.

In the position illustrated in FIG. 1, the protector 10 is shown in the state when it is mounted on the male end 2 of a component. The coupling 20 is in engagement with the threading 3 of the male end 2. The portion of small diameter 42 of the sealing device 40 is in clamping, hermetic contact with the external surface of a running part (body 1) of the component. The running part extends beyond the male end 2. The running part comprises as-rolled surfaces with a roughness Ra of the order of 12.5 μm to 16 μm.

The sealing element 50 arranged on the opposite side is in contact with an internal surface 7 close to the end part 4 of the male end 2. In the embodiment shown, the end surface of the male end 2 is an axial stop 5 slightly inclined with an angle of about 20° relative to a radial plane. The junction between the machined axial stop 5 and the as-rolled bore 8 of the body 1 is provided by a machined internal surface 7. The axial length of said internal surface 7 is not defined precisely, as this surface can absorb the wide tolerances of the bore 8 of the body 1 relative to the narrow tolerances of the machined axial stop 5. The roughness Ra of said machined internal surface can be comprised between 6 μm and 7 μm, for example equal to 6.3 μm; the value Ra can be measured with a rugosimeter or by visual-tactile comparison of the surface to be measured with a roughness gauge. Said internal surface 7 has, in this instance, a substantially cylindrical portion in the vicinity of the axial stop 5, and a tapered portion in the vicinity of the bore 8. The sealing element 50 comes in contact with said machined internal surface 7 by the active part 52, which is rounded and bulges outwards and slightly downstream. Thus, the convex surface 54 of the active part 52 can be angularly centred on the normal to the internal surface 7.

In FIG. 2, the protector 10 is shown in a theoretical state, in the absence of the component. This representation has the aim of better comprehension of the form of the protector 10 but does not occur in reality. In fact, the portion of small diameter 42 of the sealing device 40 would tend to retract. The diameter in the free state of the portion of small diameter 42 of the sealing device 40 is less than the diameter of the external surface of the body 1 with which it is intended to interact. The difference in diameter can be of the order of 2 to 20%, preferably from 2 to 10% and more preferably about 5%.

In the configuration illustrated in FIG. 3, the portion of small diameter 42 of the sealing device 40 is folded inwards in contact with the bore of the downstream part 24 of the coupling 20. The protector 10 is thus in a storage position, in particular for long-term storage in the absence of a component. In the configuration illustrated in FIG. 4, the portion of small diameter 42 of the sealing device 40 is folded on the portion of large diameter 41, the concepts of small diameter and of large diameter being inverted with respect to FIGS. 1 to 3. In other words, the portion ensuring, in the active position, hermeticity with the component is folded onto the portion ensuring hermeticity with the coupling 20. This position is temporary and permits easy make up of the coupling 20 onto the male end 2 of a component. Once the coupling 20 is made up, the portion of the sealing device 40, located externally in this case, will then be folded, in the same manner as a sock that is folded on itself, hence the designation sock-seal used in practice. Depending on the elasticity of the portion, in this case external, folding can be carried out by rolling the linking portion 43 towards the external surface of the body 1 or alternatively by stretching radially outwards the portion that is external here, and bringing it onto the external surface of the body 1.

Figure 5:
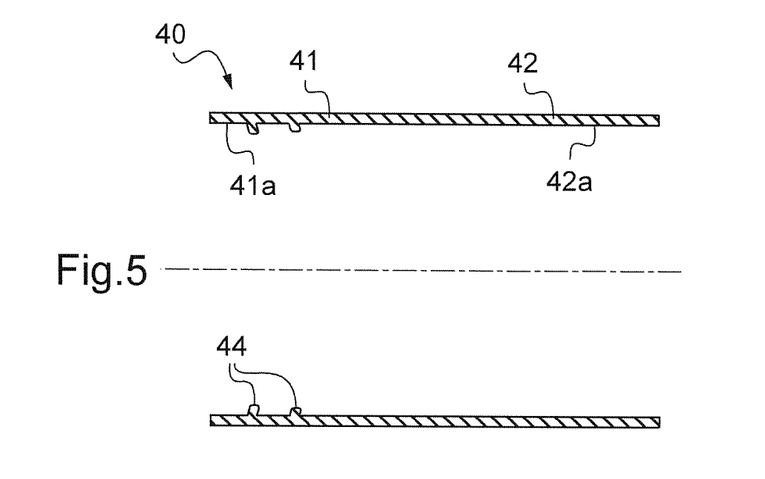
FIGS. 5 to 10 illustrate diagrammatically, in a longitudinal sectional view, examples of sealing devices in the free state.

In the embodiment illustrated in FIG. 5, the sealing device 40, shown in the free state, has an external surface that is very slightly tapered and a bore that is substantially cylindrical except for the ribs 44. The thickness of the sealing device 40 decreases very slightly in the upstream direction.

Figure 6:
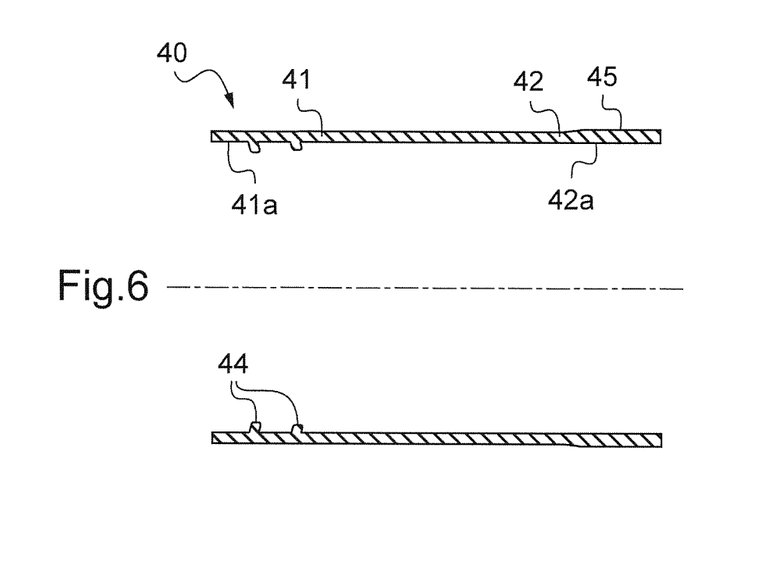
Figure 7:
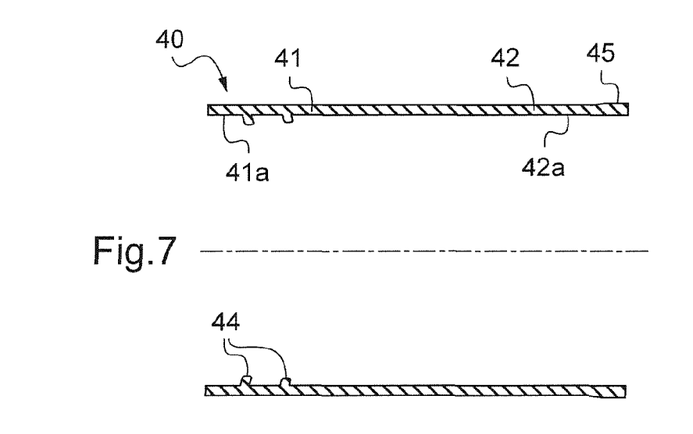
Figure 8:
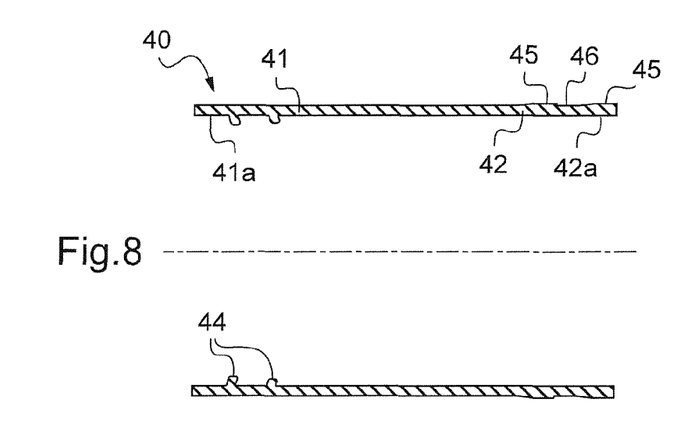
Figure 9:
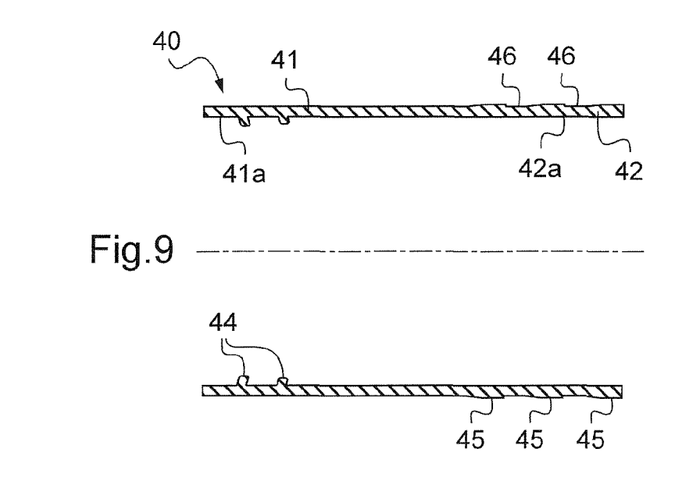
Figure 10:
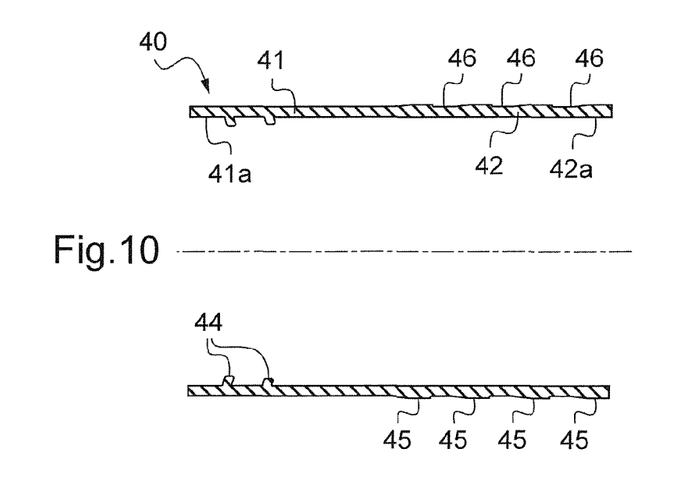
Figures 11, 12:
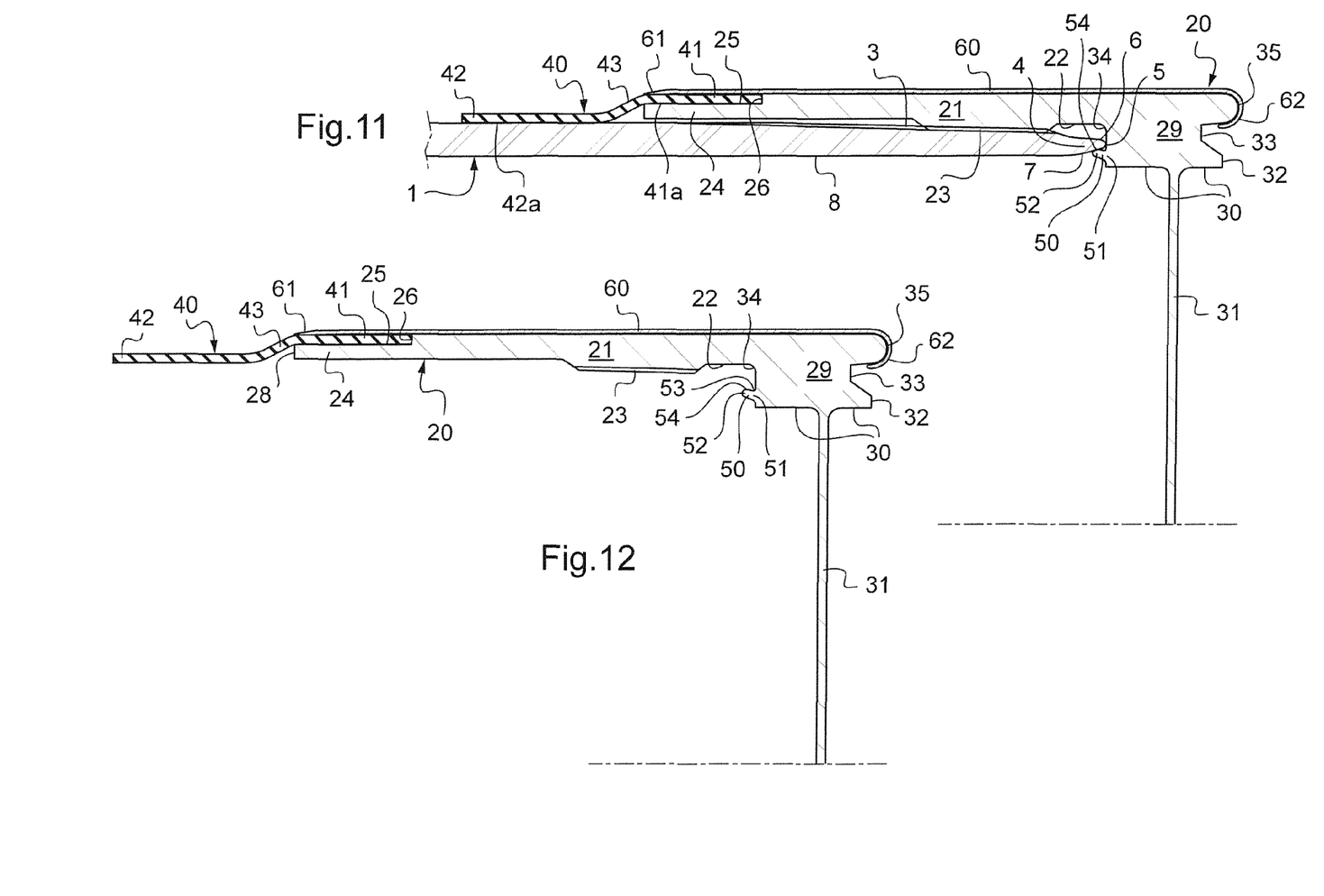
FIG. 11 shows diagrammatically, in a half-view in longitudinal section, a second example of a male end equipped with a protector.
FIG. 12 shows diagrammatically, in a half-view in longitudinal section, a second example of a protector in the mounted state.
Figures 13, 14:
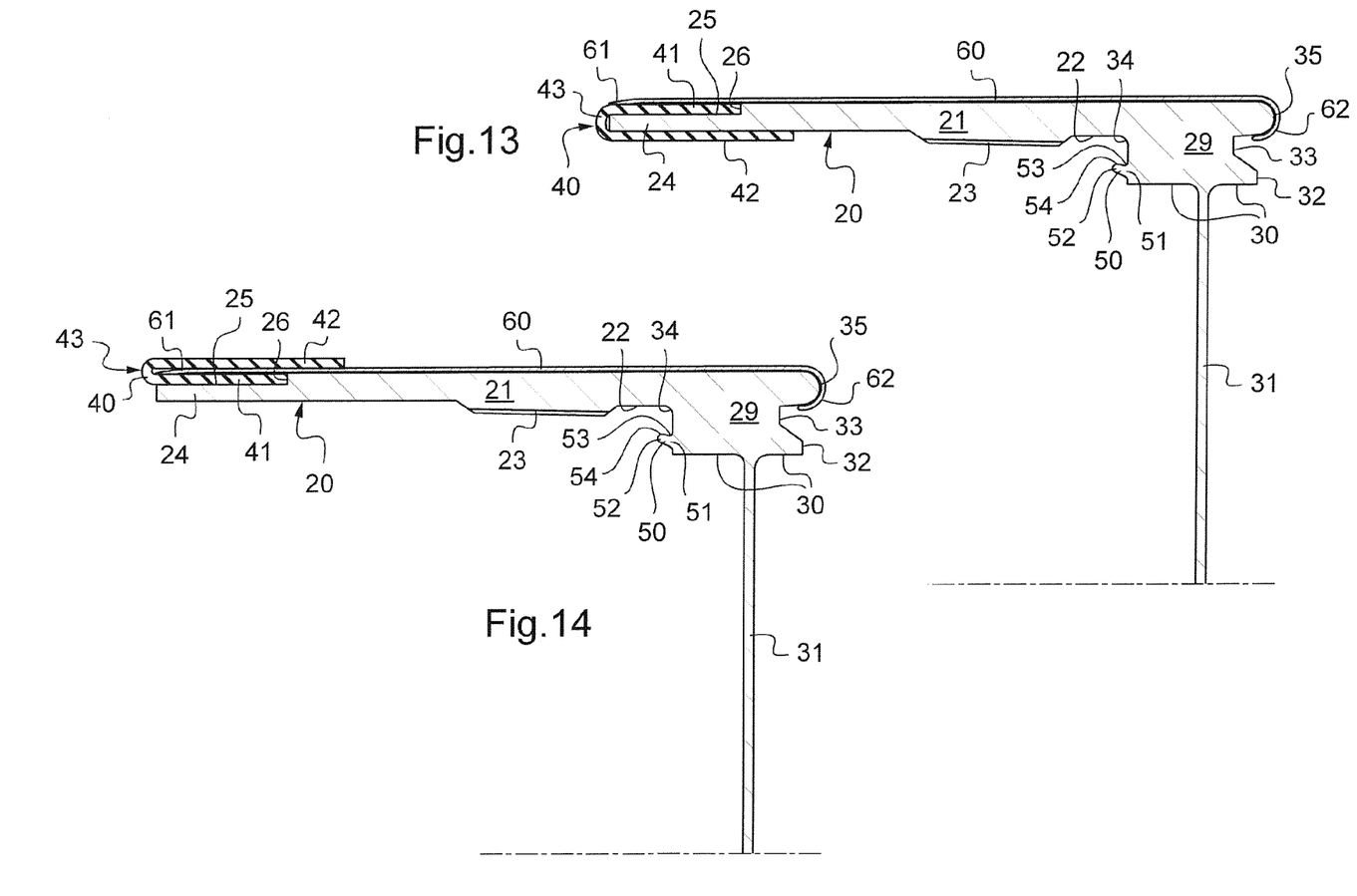
FIG. 13 shows diagrammatically, in a half-view in longitudinal section, a second example of a protector in the storage state.
FIG. 14 shows diagrammatically, in a half-view in longitudinal section, a second example of a protector in the state ready to be fitted.
Figure 15:
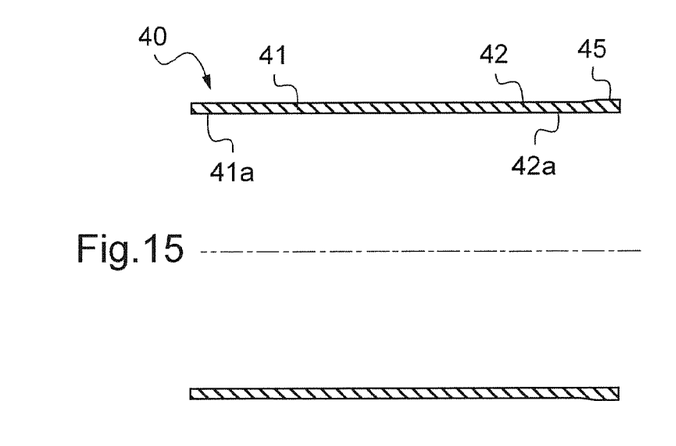
FIGS. 15 to 18 illustrate diagrammatically, in a longitudinal sectional view, examples of sealing devices in the free state.

In the embodiment illustrated in FIG. 6, the bore of the sealing device 40 is similar to the preceding embodiment. The external surface has, at the end opposite the ribs 44, a slight extra thickness 45 directed radially outwards and extending axially over a length of the order of 10 to 20% of the length of the sealing device 40. The extra thickness 45 provides greater clamping of the portion of small diameter 42 in contact with the external surface of the body 1 and consequently improved hermeticity.

In the embodiment in FIGS. 5 and 6, the sealing device 40 can be made of Santoprene, manufactured by Exxon Mobil.

In the embodiments illustrated in FIGS. 7 to 10, the sealing devices 40 comprise respectively 1 to 4 annular extra thicknesses 45 directed outwards and spaced axially. Each extra thickness 45 has a length in the axial direction much less than that of the embodiment in FIG. 6, for example of the order of 2 to 10% of the length of the sealing device 40 while being spaced, in the embodiments in FIGS. 8 to 10, by an axial distance substantially equal to their axial length. Thus, in FIG. 7, the sealing device 40 comprises a band forming radial extra thickness 45 outwards and extending near the free end of the portion of small diameter 42 that comes in contact with the body 1. In the embodiment in FIG. 8, the sealing device 40 comprises an extra thickness 45—supplementary band relative to the embodiment in FIG. 7—spaced from the first band by a zone 46 having an outside diameter equal to that of the rest of the sealing device 40 in the free state and so on for the embodiments in FIGS. 9 and 10 with respectively three and four extra thicknesses 45; two and three zones 46.

FIGS. 11 to 14 show, in the same order as FIGS. 1 to 4, another embodiment. The coupling 20 comprises in this case a downstream part 24 provided with an external surface 25 that is a cylinder of revolution extending between the shoulder 26 on the upstream side and an end surface 28 on the downstream side. The end surface 28 is in this case substantially radial. The upstream part 29 of the coupling 20 comprises an end surface 32 in which an annular groove 33 has been made. The annular groove 33 has a substantially radial bottom, a substantially axial edge on the external side and a tapered edge on the internal side. The upstream part 29 of the coupling 20 comprises an approximately radial surface arranged between the inner edge of the groove 33 and the bore 30 of said upstream part 29. Externally, between the outer edge of the groove 33 and the external surface that is a cylinder of revolution of the upstream part 29, a rounded surface is provided, for example in the form of a rolled edge 35 that is semicircular in profile.

The sealing device 40 has, on its portion of large diameter 41, a substantially cylindrical bore. Positive connection between the sealing device 40 and the coupling 20 is provided on the one hand by the clamping of the portion of large diameter 41 of the sealing device 40 on the external surface 25 of the downstream part 24 of the coupling 20 owing to the elasticity of the sealing device 40 and a diameter in the free state less than the diameter of the external surface 25 of the downstream part 24 of the coupling 20. Positive connection between the sealing device 40 and the coupling 20 is also provided by a shell or envelope 60 surrounding said parts. The protector 10 thus comprises an external envelope 60. The envelope 60 is mainly in the form of a portion of a tube of sheet metal, for example of galvanized steel sheet. The envelope 60 has a thickness of the order of 1 to 2 mm, for example 1.3 mm. The envelope 60 follows the shape of the external surface of the central part 21 and the upstream part 29 of the coupling 20. The envelope 60 extends substantially to the same level as the end surface 32 of the downstream part 24 of the coupling 20. A downstream end zone 61 of the envelope 60 is swaged and will clamp the portion of large diameter 41 of the sealing device 40. Plastic deformation of the downstream zone of the envelope 60 takes place, providing a permanent clamping force of the sealing device 40 on the coupling 20. The envelope 60 comprises an upstream end zone 62 with a shape matching the annular rolled edge 35 of the coupling 20. The envelope 60 comprises an upstream end zone 62 folded as a semicircle inwards. The upstream end zone 62 of the envelope 60 has a half-torus shape. The envelope 60 is integral. Before assembly, the envelope 60 has a cylindrical main part extending from the upstream end to the downstream half-torus. The envelope 60 is thus threaded on the coupling 20 and then the downstream end 61 is swaged so as to clamp the sealing device 40 on the coupling 20.

The internal surface 7 is in this case tapered. The angle of the tapered cone is for example comprised between 5° and 20° relative to the axis of the component. The axial length of said internal surface 7 is not defined precisely, as the tapered cone can absorb the wide tolerances of the bore 8 of the body 1 relative to the narrow tolerances of the machined axial stop 5.

The embodiment in FIGS. 11 to 14 has an additional difference relative to the embodiments in FIGS. 1 to 4, in that the sealing element 50 that comes into contact internally with the male end 2 is derived from the shoulder 34 between the central part 21 and the upstream part 29 of the coupling 20 while being displaced radially outwards relative to the bore 30 of the upstream part 29. The sealing element 50 comprises in this case a base 51 provided with a tapered surface joining to the shoulder 34.

In the embodiments in FIGS. 7 to 10 and 15 to 18, the sealing device 40 can be made of neoprene. The sealing device 40 illustrated in FIG. 15 has a bore that is a cylinder of revolution and an external surface that is also a cylinder of revolution apart from a band forming a localized extra thickness 45 in the immediate vicinity of the downstream end. The extra thickness can be of the order of 0.4 mm to 1.2 mm, preferably 0.5 to 0.7 mm, for example 0.6 mm.

Figure 16:
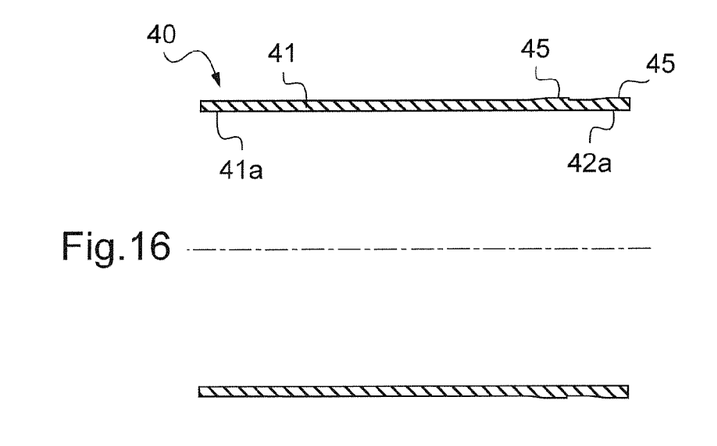

In the embodiment illustrated in FIG. 16, the sealing device 40 comprises two annular bands or extra thicknesses 45 similar in their shape and dimensions to those in the preceding figure and spaced axially by a distance close to the axial length of one of these two bands.

Figure 17:
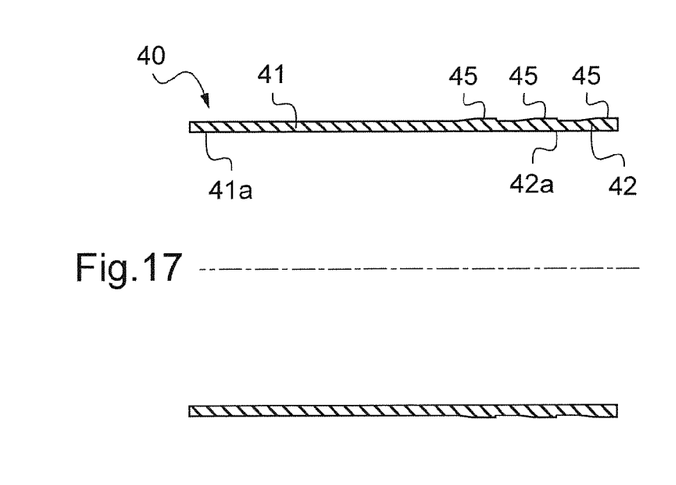
Figure 18:
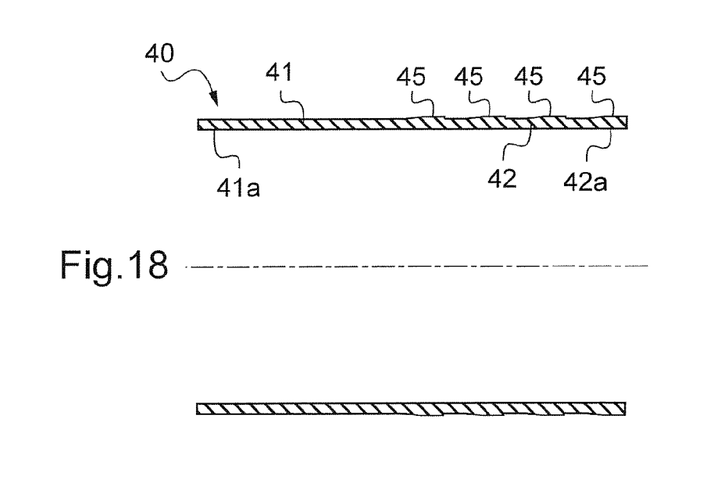

In the embodiment in FIG. 17, the sealing device 40 is provided with three bands or extra thicknesses 45. In the embodiment in FIG. 18, the sealing device 40 is provided with four bands or extra thicknesses 45. Owing to these bands with localized extra thickness, there is local reinforcement of the clamping of the portion of small diameter 42 of the sealing device 40 on the external surface of the body 1, thus forming a plurality of graded seals. The risk of penetration of foreign bodies is reduced.

The active part 52 of the active sealing element 50 on the upstream side is in annular contact with the machined internal surface of the component. The active part 52 can have a radius comprised between 1 and 3 mm, preferably between 1 and 2.5 mm. The base 51 of the sealing element 50 can have a thickness comprised between 1.5 and 3 mm. The base 51 of the sealing element 50 can be thinner than the functional part in contact with the component, thus permitting a slight deflection of the lip so that it best matches the machined surface on its entire perimeter. It is particularly advantageous to use a machined surface that is present for manufacturing reasons and is inactive when the connection is in the state with a male component made up with a female component. In fact, any slight deterioration of the machined internal surface that is inactive in terms of hermeticity makes it possible to maintain the properties of hermeticity of the connection. The risk of troublesome deterioration is therefore greatly reduced.

The invention is not limited to the examples of the method and apparatus for control of tubular spindle axes described above, only as examples, but includes all the variants that can be envisaged by a person skilled in the art within the scope of the following claims.

The invention claimed is:

1. A temporary protector of a male end of a component of a threaded tubular connection for drilling or operation of oil wells, including externally at least one threading and including a free end part, the component including a body downstream of the male end, the protector comprising:

a coupling configured to protect at least a part of the external threading and the free end part and including a threading that can engage with the threading of the male end; and a sealing device configured to be placed in contact with the component, at least in a part located downstream of the external threading of the male end, and with the coupling to provide a seal downstream of the external threading;

wherein the sealing device comprises a portion of small diameter with a length between 20 and 80 mm and with a bore as a cylinder of revolution, the portion of small diameter including an internal sealing surface that can interact hermetically with an external surface of the body having a maximum tolerance on diameter above 1% and a roughness Ra greater than 10 μm, and a portion of large diameter integral with the portion of small diameter and including an internal sealing surface interacting hermetically with an external surface of the coupling, the sealing device being radially elastic, and wherein the sealing device comprises at least one annular extra thickness on the portion of small diameter and projecting outwards.

2. A protector according to claim 1, wherein the portion of small diameter has a thickness between 2 and 8 mm and the portion of large diameter has a thickness between 2 and 8 mm.

3. A protector according to claim 1, wherein the internal sealing surface of the portion of small diameter and the internal sealing surface of the portion of large diameter are made of a same material and/or the portion of small diameter and the portion of large diameter are made of a same material.

4. A protector according to claim 1, wherein the internal sealing surface of the portion of large diameter is in direct contact with the coupling.

5. A protector according to claim 1, wherein the internal sealing surface of the portion of large diameter includes at least one annular rib directed inwards.

6. A protector according to claim 1, wherein the external surface of the coupling is arranged at a distance axially from the threading made on the bore of the coupling, the threading comprising from 4 to 10.

7. A protector according to claim 1, wherein the external surface of the coupling is a cylinder of revolution.

8. A protector according to claim 1, wherein the external surface of the coupling and the internal sealing surface of the portion of large diameter interact by complementarity of convex and concave forms.

9. A protector according to claim 1, further comprising an envelope at least partly surrounding the coupling and at least partly the portion of large diameter, the envelope comprising a folded edge on one end of the coupling and an end opposite to the edge, clamping the portion of large diameter against the coupling.

10. A protector according to claim 1, further comprising a sealing element configured to come into contact with an internal surface of the male end.

11. A protector according to claim 10, wherein the sealing element comprises an annular lip integral with the coupling and including a rounded surface over at least 90°.

12. A protector according to claim 10, wherein the sealing element comprises an annular lip oriented axially towards the sealing device and radially towards the sealing device and supported by a wall of the coupling arranged axially opposite the sealing device.

13. A component of threaded tubular connection for drilling or operation of oil wells, comprising a male end provided externally with at least one threading and comprising a free end part, the component including a protector according to claim 1 made up onto the threading, the portion of small diameter being in hermetic contact with the component, at least in a part located downstream of the external threading of the male end.

14. A component according to claim 13, wherein the diameter in the free state of the portion of small diameter is less than the diameter of the external surface of the body on which the portion of small diameter is mounted, the relative difference in diameter being from 2 to 20%.

15. A component according to claim 13, wherein the diameter in the free state of the portion of small diameter is less than the diameter of the external surface of the body on which the portion of small diameter is mounted, the relative difference in diameter being from 2 to 10%.

16. A component according to claim 13, wherein the diameter in the free state of the portion of small diameter is less than the diameter of the external surface of the body on which the portion of small diameter is mounted, the relative difference in diameter being about 5%.

17. A protector according to claim 1, wherein the external surface of the coupling is arranged at a distance axially from the threading made on the bore of the coupling, the threading comprising from 5 to 8 threads.

18. A temporary protector of a male end of a component of a threaded tubular connection for drilling or operation of oil wells, including externally at least one threading and including a free end part, the component including a body downstream of the male end, the protector comprising:
  a coupling configured to protect at least a part of the external threading and the free end part and including a threading that can engage with the threading of the male end; and
  a sealing device configured to be placed in contact with the component, at least in a part located downstream of the external threading of the male end, and with the coupling to provide a seal downstream of the external threading;
  wherein the sealing device comprises a portion of small diameter with a length between 20 and 80 mm and with a bore as a cylinder of revolution, the portion of small diameter including an internal sealing surface that can interact hermetically with an external surface of the body having a maximum tolerance on diameter above 1% and a roughness Ra greater than 10 µm, and a portion of large diameter integral with the portion of small diameter and including an internal sealing surface interacting hermetically with an external surface of the coupling, the sealing device being radially elastic, and
  wherein the protector further comprises an envelope at least partly surrounding the coupling and at least partly the portion of large diameter, the envelope comprising a folded edge on one end of the coupling and an end opposite to the edge, clamping the portion of large diameter against the coupling.

19. A temporary protector of a male end of a component of a threaded tubular connection for drilling or operation of oil wells, including externally at least one threading and including a free end part, the component including a body downstream of the male end, the protector comprising:
  a coupling configured to protect at least a part of the external threading and the free end part and including a threading that can engage with the threading of the male end;
  a sealing device configured to be placed in contact with the component, at least in a part located downstream of the external threading of the male end, and with the coupling to provide a seal downstream of the external threading; and
  a sealing element configured to come into contact with an internal surface of the male end
  wherein the sealing device comprises a portion of small diameter with a length between 20 and 80 mm and with a bore as a cylinder of revolution, the portion of small diameter including an internal sealing surface that can interact hermetically with an external surface of the body having a maximum tolerance on diameter above 1% and a roughness Ra greater than 10 µm, and a portion of large diameter integral with the portion of small diameter and including an internal sealing surface interacting hermetically with an external surface of the coupling, the sealing device being radially elastic, and
  wherein the sealing element comprises an annular lip integral with the coupling and including a rounded surface over at least 90°.

* * * * *